United States Patent [19]

Ikegami

[11] Patent Number: 5,828,663
[45] Date of Patent: Oct. 27, 1998

[54] ACCESS CONTROL SYSTEM FOR WIRELESS-LAN TERMINALS

[75] Inventor: Yoshikazu Ikegami, Tokyo, Japan

[73] Assignee: NEC Corp., Japan

[21] Appl. No.: 564,685

[22] Filed: Dec. 1, 1995

[30] Foreign Application Priority Data

Dec. 2, 1994 [JP] Japan ................................. 6-329321

[51] Int. Cl.⁶ .......................... H04L 12/413; H04B 7/204
[52] U.S. Cl. ......................... 370/347; 370/448; 340/825.5
[58] Field of Search .................................. 370/329, 341, 370/347, 348, 445, 448, 462; 340/825.5

[56] References Cited

U.S. PATENT DOCUMENTS

| 5,321,542 | 6/1994 | Freitas et al. | 35/172 |
| 5,369,639 | 11/1994 | Kamerman et al. | 370/85.3 |
| 5,379,290 | 1/1995 | Kleijne | 370/85.2 |

FOREIGN PATENT DOCUMENTS 4-373343  12/1992  Japan .

Primary Examiner—Melvin Marcelo
Assistant Examiner—Andrew Lee Chiho
Attorney, Agent, or Firm—Ostrolenk, Faber, Gerb & Soffen, LLP

[57] ABSTRACT

A wireless-LAN terminal comprises a wired-LAN controller, a wireless modem and an access controller intervening between the wired-LAN controller and the wireless modem. In the access controller, the termination of data reception and the occurrence of a transmission request are detected by monitoring a frame-sense (FS) signal and a request-to-send (RTS) signal, respectively. An IFS period is generated by a delay timer when the data reception is terminated and a random amount of time is generated by using a backoff algorithm when the transmission request occurs during a transmission inhibition period. The data transmission is waited until the random amount of time comes to an end, and the data transmission is started when the random amount of time has elapsed and the transmission channel is available. Since a backoff period is determined randomly for each terminal, there is a remarkably reduced probability that a plurality of terminals concurrently start the media access for data transmission.

19 Claims, 6 Drawing Sheets

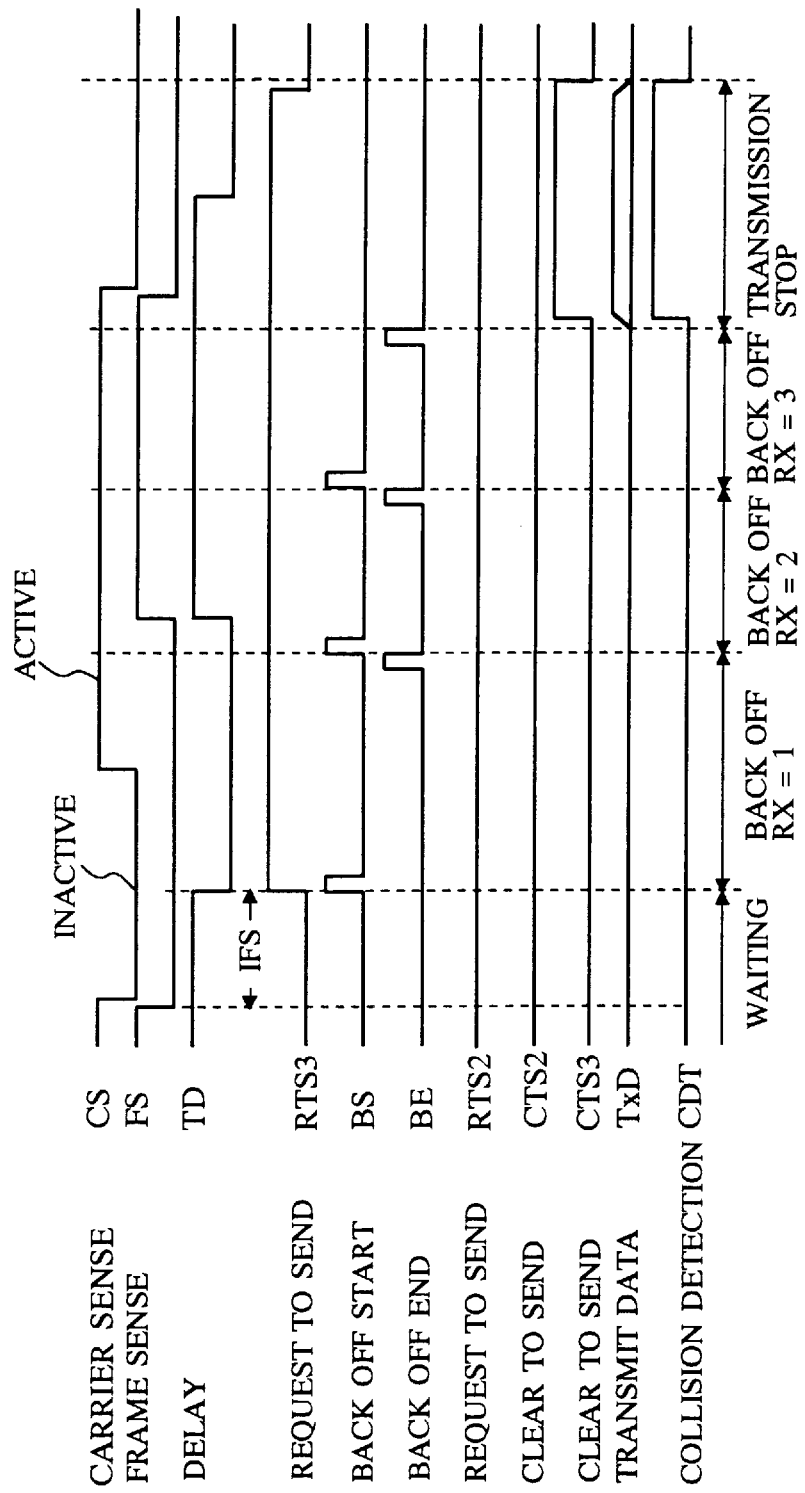

ACCESS CONTROL SYSTEM FOR WIRELESS-LAN TERMINALS

BACKGROUND OF THE INVENTION

1. Field of the Invention

The present invention generally relates to wireless networks, and in particular to an access control method and system for a wireless terminal employing a carrier sense multiple access (CSMA) scheme.

2. Description of the Related Art

With the wide use of wired floor local-area networks (LANs), such as Ethernet and Token Ring, many users are increasingly desire wireless LANs which provide terminals with portability. It is expected that, introducing a wireless LAN into an office, layout change or rearrangement becomes very easy. Furthermore, looking ahead, wireless LANs also have the possibility for realizing the nomadic computing so called.

An access control for use in wireless LANs is basically classified into a centralized control and a decentralized control. The centralized control system, as shown in FIG. 1, requires a center control station 1 through which all the terminals make communications with each other. Although the centralized control system has the advantage of network management and resistance to interference by hidden terminals, its system reliability is relatively low because the whole LAN system will go down in the event of failure of the center control station 1. In addition, since the center station 1 is necessary without regard to the size of the centralized LAN system, it is comparatively expensive in the case of a smaller LAN system. Therefore, standardized wireless LANs have been developed based on the decentralized control scheme.

The decentralized control for use in wireless LANs may be applied to a peer-to-peer access control system as shown in FIG. 2 and a via-repeater access control system as shown in FIG. 3. Since the via-repeater access control system requires a repeater 2 as an access point, the same disadvantage as the centralized control system is developed, that is, communications between the terminals will be impossible in the event of failure of the access point.

Furthermore, in the decentralized control systems, both transmission and reception are performed through the same frequency band. Therefore, a terminal, while transmitting data packets to a certain terminal, cannot detect the collision of data packets transmitted by other terminals, which means that the CSMA/CD protocol known well in wired floor LANs may not be employed as it is. If the CSMA/CD protocol is employed, the above-mentioned decentralized systems will face the inevitable reduced throughput. In cases where a single terminal is in transmission while several other terminals are concurrently waiting for transmitting, the other terminals will start transmitting at the same time when the interframe-spacing (IFS) period has elapsed after the single terminal completes the transmission. Therefore, the probability of packet collision is substantially increased, resulting in reduced throughput of the wireless LAN.

A method for detecting such a collision is disclosed in Japanese Patent Unexamined Publication No. 4-373343. According to this method, previous to the transmission of data packets, each terminal transmits its own test signal to its own service area through a predetermined frequency band. And then the terminal checks whether any test signal other than the test signal of its own is received. If another test signal is received, the terminal recognizes to be in collision with other terminals. Therefore, the CSMA/CD protocol may be applied to wireless LAN system employing such a collision detecting method.

However, in order to realize such a collision detecting method, extra control processes such as carrier switching for test signal transmission waits and test signal receiving are performed previous to the data packet transmission. Therefore, the radio system of each terminal needs to be provided with several analog circuits such as a switch and a delay circuit dedicated to the test signal transmission and reception. This causes the radio system of each terminal to increase in size and complexity, resulting in the cost rising and the miniaturization being interrupted.

SUMMARY OF THE INVENTION

An object of the present invention is to provide a wireless LAN system which employs the CSMA/CD protocol with simple circuit configuration and high throughput.

Another object of the present invention is to provide a transmission control method in a wireless-LAN terminal which suppresses the possibilities of causing packet collisions between terminals.

Still another object of the present invention is to provide an interface circuit and method for connecting a wireless-LAN transmitter/receiver system to a wired-LAN controller incorporating the CSMA/CD protocol.

A wireless network employs a carrier sense multiple access (CSMA) scheme and the access controller of a wireless terminal performs as follows. The termination of data reception and the occurrence of a transmission request can be detected by monitoring, for example, a frame-sense (FS) signal and a request-to-send (RTS) signal, respectively. A predetermined time period is generated when the data reception is terminated and a random amount of time is also generated by using, for example, a backoff algorithm when the transmission request occurs during a transmission inhibition period comprising a total of a data reception period and the time period. The data transmission associated with the transmission request is waited until the random amount of time comes to an end. And the data transmission associated with said transmission request is started when the random amount of time has elapsed and the transmission channel is available. Furthermore, the random amount of time may be generated repeatedly while the transmission channel is not available until the repetition number reaches a predetermined maximum value. When the transmission channel is not available with the repetition number exceeding the predetermined maximum value, the data transmission is halted and a collision detection signal CDT is output to the wired-LAN controller.

According to an aspect of the present invention, the access control is changed from a waiting state into a backoff process state at the time when the IFS period has elapsed. Since a backoff period is determined randomly for each terminal, there is a remarkably reduced probability that a plurality of terminals concurrently start the media access for data transmission. The repetition number of the backoff processes may be properly determined. At the end of each backoff period, it is checked whether the transmission channel is available or not. If the transmission is possible at the time when a backoff period has elapsed, then a predetermined transmission procedure is started, and if impossible, then the backoff process is repeated with each checking the activity of the transmission channel until the repetition number reaches the preset maximum. If the transmission channel is not available even when the last backoff period has elapsed, the access control stops the transmission procedure.

According to another aspect of the present invention, a wireless-LAN terminal is comprised of a wired-LAN controller, a wireless transmitter-receiver system and an access controller intervening between the wired-LAN controller and the wireless transmitter-receiver system. The access controller performs the above-mentioned access control.

BRIEF DESCRIPTION OF THE DRAWINGS

FIG. 8 is a timing chart showing an operation of transmission stop in the wireless-LAN access controller of the embodiment.

DETAILED DESCRIPTION OF THE PREFERRED EMBODIMENTS

Figure 1:
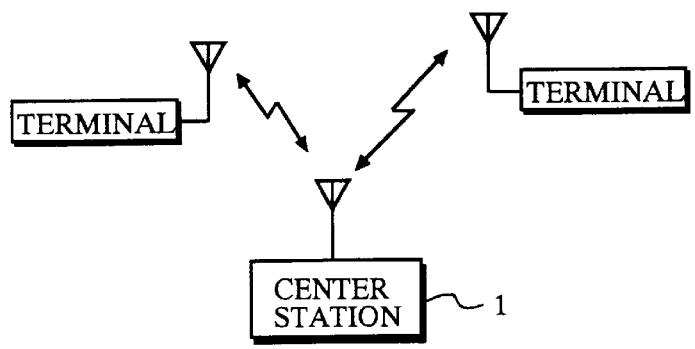
FIG. 1 is a schematic diagram showing a wireless LAN having a centralized control scheme.
Figure 2:
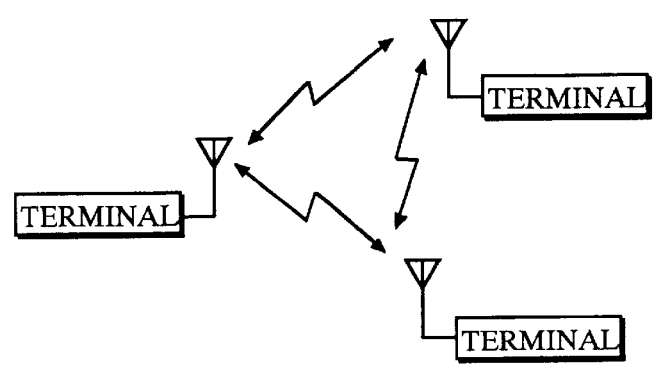
FIG. 2 is a schematic diagram showing a wireless LAN having a peer-to-peer decentralized control scheme.
Figure 3:
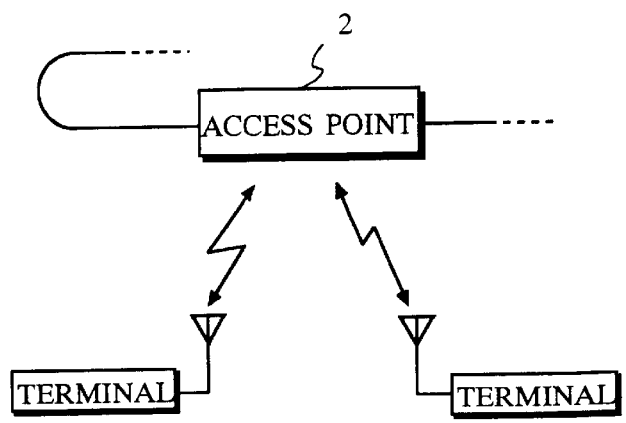
FIG. 3 is a schematic diagram showing a wireless LAN having a via-repeater decentralized control scheme.
Figure 4:
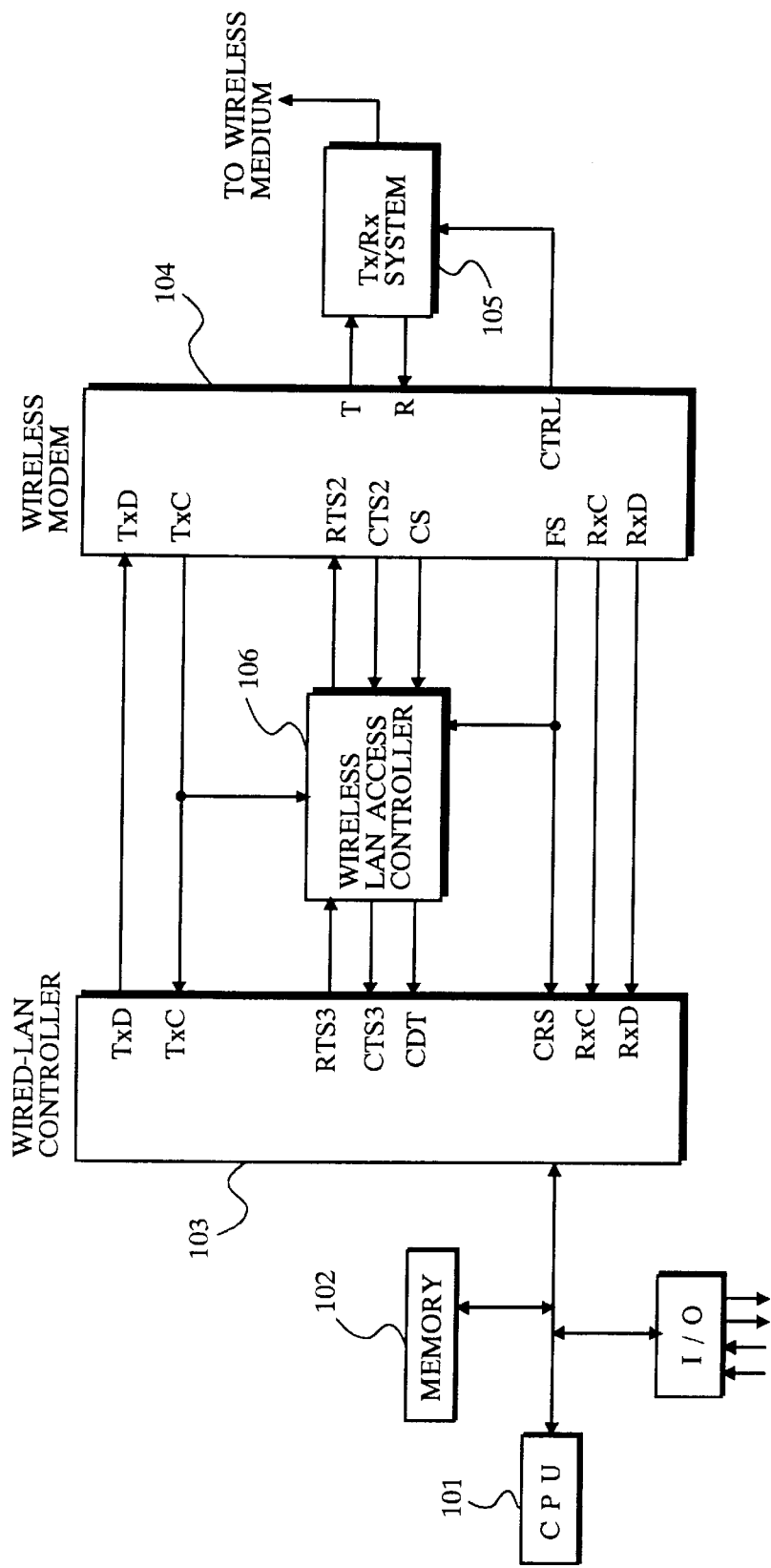
FIG. 4 is a block diagram showing a wireless-LAN terminal according to an embodiment of the present invention.

Referring to FIG. 4, a wireless-LAN terminal according to the present invention is comprised of a central processing unit (CPU) 101, a memory 102, a wired-LAN controller 103, a wireless modem (modulator-demodulator) 104, a transmitter-receiver system 105, a wireless-LAN access controller 106 and other necessary circuits. The CPU 101 performs a communication control of the wireless-LAN terminal according to the software for LANs. For example, the CPU 101 initializes the LAN controller 103, transfers transmission data and reception data to the respective areas of the memory 102, and performs data processing of the reception data which has been stored in the memory 102.

The LAN controller 103 is formed with an integrated circuit where the access control protocol of CSMA/CD is incorporated as usually employed in existing wired floor LANs. In response to the transmission request received from the CPU 101, the LAN controller 103 starts performing transmission procedures in accordance with the CSMA/CD protocol. More specifically, when the LAN controller 103 receives the clear-to-send signal CTS3 from the wireless-LAN access controller 106 after making the request-to-send signal RTS3 active, the transmission data is fed into the LAN controller 103 from the memory 102 and is assembled into data packets TxD which are transferred to the wireless modem 104 in accordance with the transmitter clock TxC. On the other hand, when the carrier-sense signal CRS which is a frame-sense signal FS of the wireless modem 104 becomes active, the LAN controller 103 inputs the reception data RxD from the wireless modem 104 in accordance with the receiver clock RxC. When the LAN controller 103 receives the transmission request from the CPU 101 while receiving the reception data RxD, the request-to-send signal RTS3 is kept inactive until the interframe-spacing (IFS) period has elapsed since the data reception is completed, as defined by the CSMA/CD protocol. In addition, when a collision detection signal CDT goes active, the LAN controller 103 recognizes the collision occurrence and then outputs dummy data to the wireless modem 104.

The wireless modem 104 is comprised of a modulator and a demodulator which are not shown because of well-known circuits. The transmission data packets TxD are used as a modulating signal to modulate a carrier wave to produce a modulated wave which is in turn transmitted to the wireless medium through the transmitter-receiver system 105. On the other hand, a modulated wave received by the transmitter-receiver system 105 is demodulated into reception data packets RxD by the wireless modem 104. The reception data packets RxD are disassembled into the reception data in accordance with the receiver clock RxC. The reception data is stored onto the memory 102 to be processed subsequently by the CPU 101.

According to the CSMA/CD protocol, the wireless modem 104 receives a request-to-send signal RTS2 from the wireless-LAN access controller 106 and outputs a clear-to-send signal CTS2 and a carrier-sense signal CS to the wireless LAN access controller 106. The wireless modem 104 performs the modulation of the transmission data packets TxD while the request-to-send signal RTS2 is active. The clear-to-send signal CTS2 is received from a destination terminal through the wireless LAN, indicating that the transmitting side can begin sending. The carrier-sense signal CS goes active when the channel frequency band is occupied by other terminals or anything else emitting a radio wave or the likes of the channel frequency. The frame-sense signal FS goes active when the frame synchronization of a received signal is established, and otherwise inactive. In other words, the frame-sense signal FS becomes active when the received signal is received from another terminal of the same wired-LAN system, and becomes inactive when that received signal is terminated.

The transmitter-receiver system 105 is determined depending on what kind of wireless medium is employed. For example, when the wireless medium is infrared, the transmitter-receiver system 105 is comprised of an infrared-emitting source as a transmitter and an infrared detector as a receiver. Employing a radio wave as the wireless medium, the transmitter-receiver system 105 is comprised of a radio transmitter and a radio receiver.

WIRELESS-LAN ACCESS CONTROLLER

The wireless-LAN access controller 106 intervenes between the wired-LAN controller 103 and the wireless modem 104. As described later, the request-to-send signal RTS2 is output to the wireless modem 104 based on the request-to-send signal RTS3, the carrier-sense signal CS and the frame-sense signal FS. The collision detection signal CDT is output to the wired-LAN controller 103 when the carrier-sense signal CS is still kept active after a lapse of variable waiting period determined by the interframe spacing and backoff processing. A more detailed description of the wireless-LAN access controller 106 will be provided hereinafter.

Figure 5:
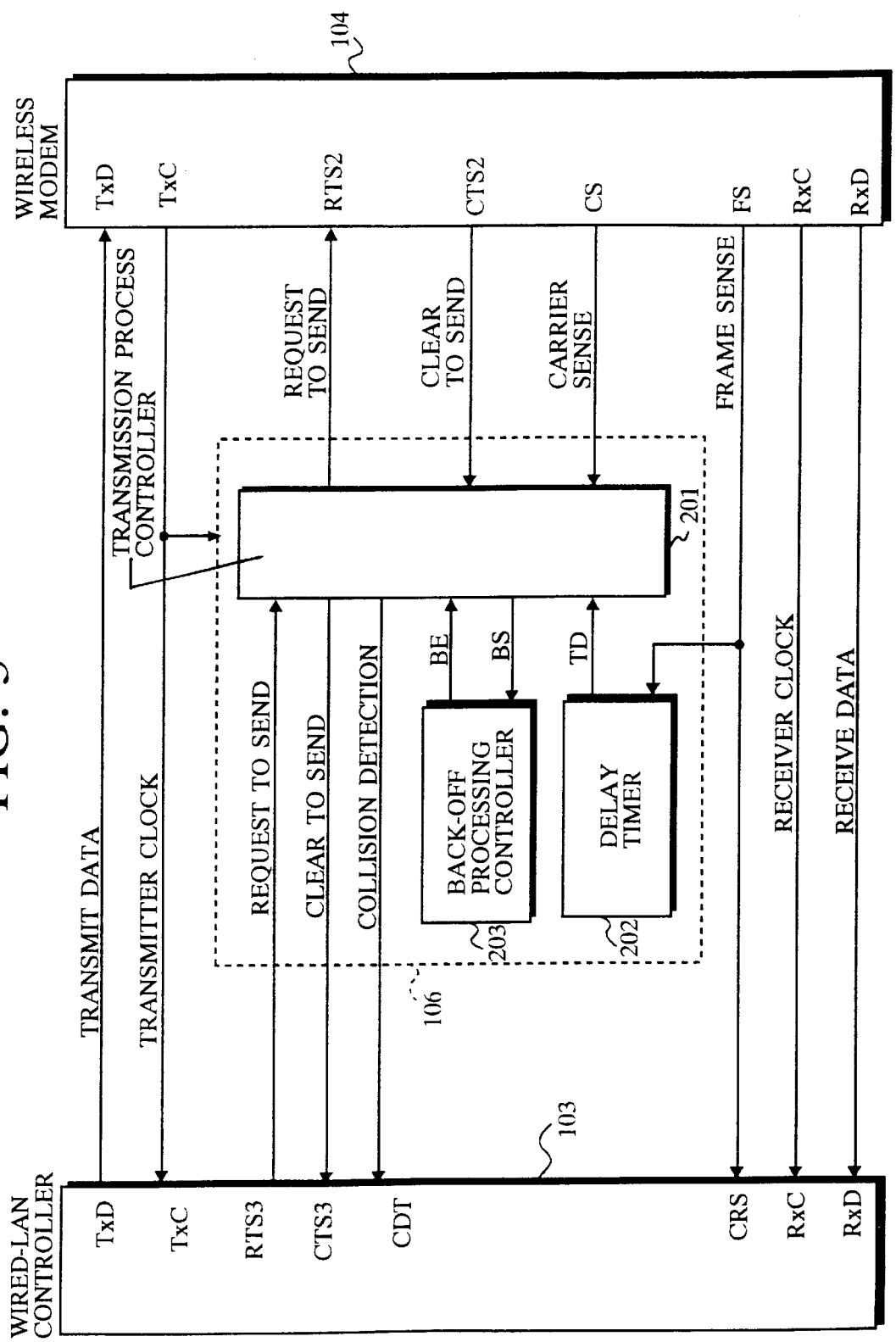
FIG. 5 is a block diagram showing a wireless-LAN access controller of the embodiment as shown in FIG. 4.

As shown in FIG. 5, the wireless-LAN access controller 106 is comprised of a transmission process controller 201, an IFS-delay timer 202 and a backoff processing controller 203. The transmission process controller 201 is designed to change in state according to conditions of input signals. The transmission process controller 201 receives the request-to-send signal RTS3 from the wired-LAN controller 103 and also receives the clear-to-send signal CTS2 and the carrier-sense signal CS from the wireless modem 104. The transmission process controller 201 outputs the request-to-send signal RTS2 to the wireless modem 104 and also outputs the clear-to-send signal CTS3 and the collision-detection signal CDT to the wired-LAN controller 103.

The transmission process controller 201 is connected to the IFS-delay timer 202 and the backoff processing controller 203. The IFS-delay timer 202 makes an IFS-delay signal TD active when the frame-sense signal FS goes active, that is, the data receiving begins, and inactive when the IFS period has elapsed after the frame-sense signal FS goes inactive. The backoff processing controller 203 receives a backoff-start signal BS from the transmission process controller 201 and sends a backoff-end signal BE back to the same. The backoff time period spanning from the output timing of the backoff-start signal BS to the backoff-end signal BE is determined by a predetermined backoff algorithm. For example, the backoff processing controller 203 incorporates a random number generator which produces a random amount of time as the backoff time period. In other words, the backoff processing controller 203 causes the transmission process controller 201 to wait a randomly determined amount of time. After a lapse of the random amount of time, the backoff-end signal BE goes active. The transmission process controller 201 changes in state in response to the input signals and produces the output signals according to the state. In addition, the transmission process controller 201 has a backoff counter (not shown) incorporated, which counts the number of times the backoff process has been carried out and is initially set at 0 (RX=0). In this embodiment, for simplicity, the maximum retrying times $Rx_{max}$ of the backoff process is assumed to be 3. It is apparent that the maximum retrying times $Rx_{max}$ of the backoff process may be set at an arbitrary figure depending on the wireless LAN system.

STATE TRANSITION OF ACCESS CONTROL

Figure 6:
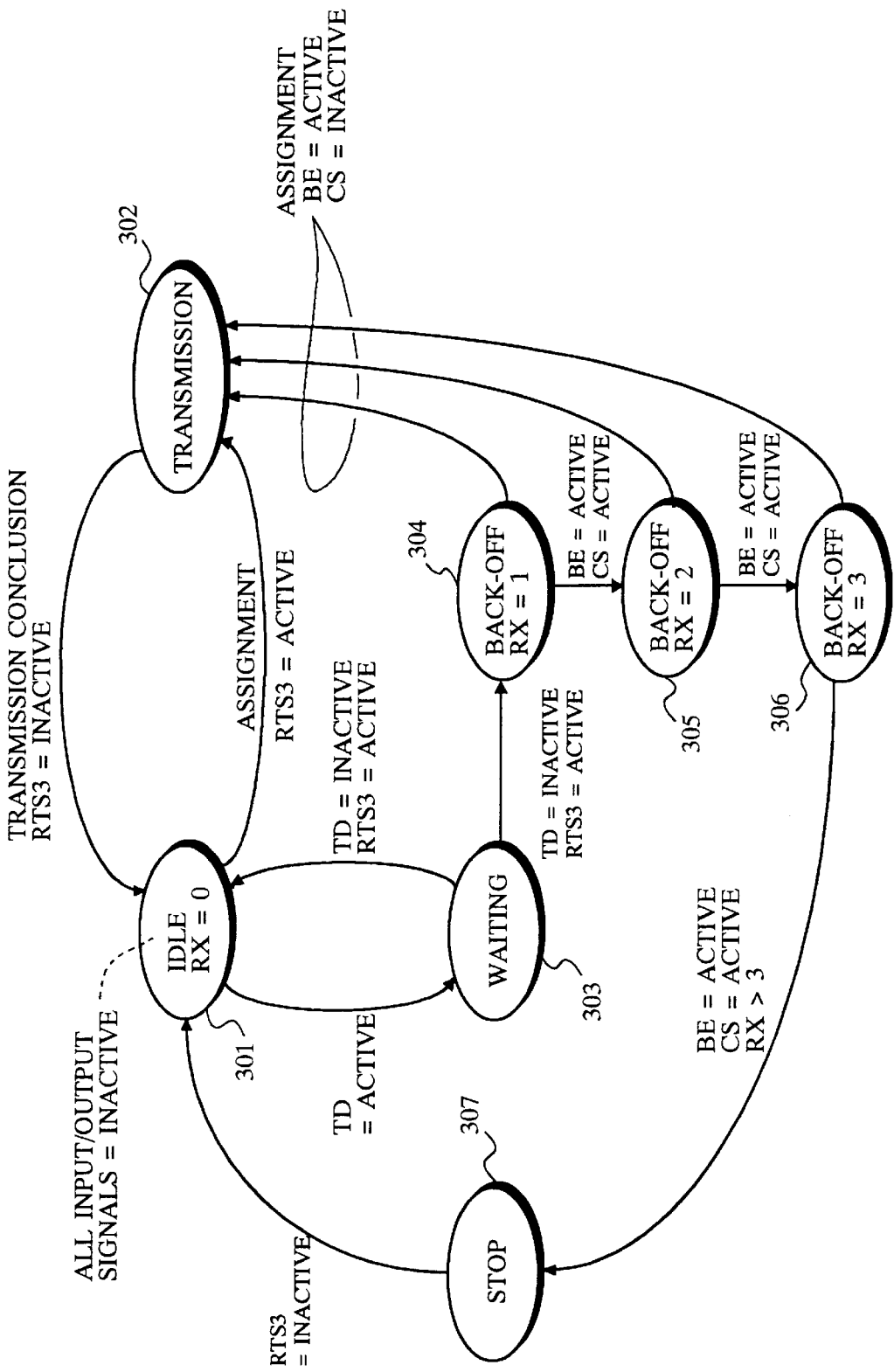
FIG. 6 is a state transition diagram showing the operation of the wireless-LAN access controller of the embodiment.

Referring to FIG. 6, it is assumed that the transmission process controller 201 is in an idle state 301 with all input and output signals inactive. In this idle state 301, when the transmission request occurs which leads to the request-to-send signal RTS3 going active, the transmission process controller 201 changes state from the idle state 301 to the transmission state 302. Since the carrier-sense signal CS remains inactive which indicates that the transmission channel of the wireless medium is available, the transmission process controller 201 makes the request-to-send signal RTS2 active, causing the wireless modem 104 to send RTS to a destination. After that, receiving CTS from the destination, the wireless modem 104 makes the clear-to-send signal CTS2 active. When the clear-to-send signal CTS2 goes active, the transmission process controller 201 makes the clear-to-send signal CTS3 active, starting the transfer of data packets TxD from the wired-LAN controller 103 to the wireless modem 104 in accordance with the transmitter clock TxC. After all the data packets TxD have been transmitted completely, the request-to-send signal RTS3 becomes inactive. This causes the transmission process controller 201 to return to the idle state 301 with the request-to-send signal RTS2 going inactive so as to terminate the data transmission.

In the idle state 301, when the IFS-delay signal TD becomes active, the transmission process controller 201 changes into a waiting state 303. The IFS-delay timer 202 makes the IFS-delay signal TD active when the frame-sense signal FS goes active, that is, the data reception begins. The IFS-delay signal TD is kept active and goes inactive when the IFS period has elapsed after the data reception is ended. Therefore, the transmission process controller 201 gets back to the idle state 301 at the time when the IFS-delay signal TD goes inactive if no transmission request occurs (or the request-to-send signal RTS3 is inactive).

If the request-to-send signal RTS3 is active at the time when the IFS period has elapsed, the transmission process controller 201 changes into a first backoff state 304 with the backoff start signal BS going active. This state transition from the waiting to the first backoff is made regardless of the activity of the transmission channel. The active backoff start signal BS causes the backoff processing controller 203 to start producing a random amount of time. At the same time, the backoff counter incorporated in the transmission process controller 201 is incremented by one (RX=1). After the random amount of time has elapsed, the backoff processing controller 203 makes the backoff end signal BE active. At this time, if the carrier-sense signal CS is inactive, or the transmission channel is available, then the transmission process controller 201 changes into the transmission state 302 in which the transmission procedures are performed as described before. On the other hand, if the carrier-sense signal CS is active, or the transmission channel is occupied by another terminal, then the transmission process controller 201 changes into a second backoff state 305 with the backoff start signal BS going active.

As described above, the active backoff start signal BS causes the backoff processing controller 203 to start producing a random amount of time. At the same time, the backoff counter incorporated in the transmission process controller 201 is incremented by one (RX=2). After the random amount of time has elapsed, the backoff processing controller 203 makes the backoff end signal BE active. At this time, if the carrier-sense signal CS is inactive, or the transmission channel is available, then the transmission process controller 201 changes into the transmission state 302 in which the transmission procedures are performed as described before. On the other hand, if the carrier-sense signal CS is still active, or the transmission channel is occupied by another terminal, then the transmission process controller 201 changes to a third backoff state 306 with the backoff start signal BS going active.

Similarly, when the backoff start signal BS goes active, the backoff processing controller 203 starts producing a random amount of time. At the same time, the backoff counter is incremented by one (RX=3). After the random amount of time has elapsed, the backoff processing controller 203 makes the backoff end signal BE active. At this time, if the carrier-sense signal CS is inactive, or the transmission channel is available, then the transmission process controller 201 changes into the transmission state 302 in which the transmission procedures are performed as described before. On the other hand, if the carrier-sense signal CS is still active, or the transmission channel is occupied by another terminal, then the transmission process controller 201 changes into a stop state 307 because of the backoff counter exceeding the maximum retrying times $RX_{max}$. At this time, the clear-to-send signal CTS3 becomes active for dummy data transfer and the collision-detection signal CDT also becomes active so as to inform the wired-LAN controller 103 of the collision occurrence. When receiving the active collision-detection signal CDT from the transmission process controller 201, the wired-LAN controller 103 makes the request-to-send signal RTS3 inactive so as to stop the transmission operation. Upon receipt of the request-to-send signal RTS3 which is inactive, the transmission process controller 201 changes into the idle state 301 when the clear-to-send signal CTS3 and the collision-detection signal CDT are made inactive.

Figure 7:
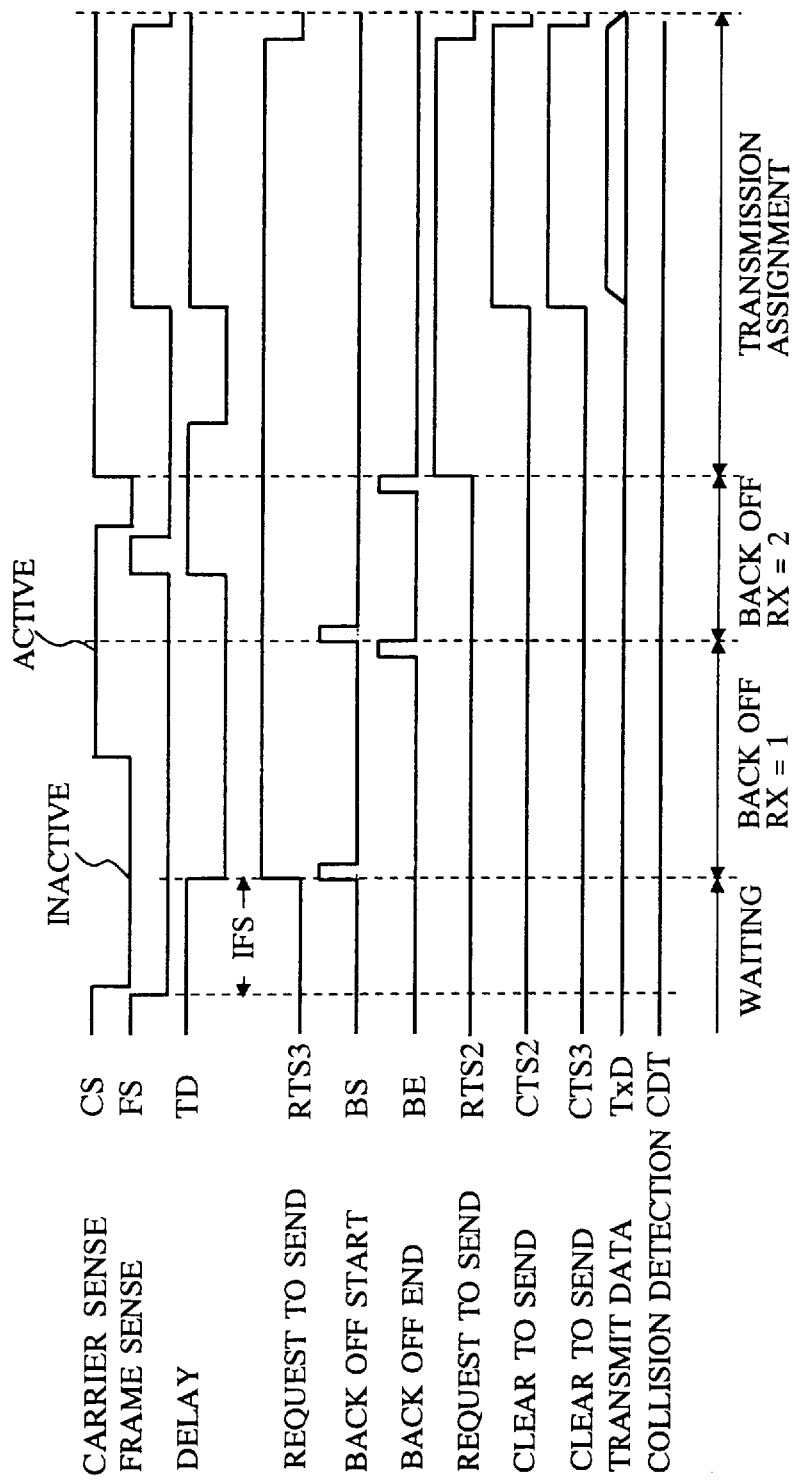
FIG. 7 is a timing chart showing an operation of transmission success in the wireless-LAN access controller of the embodiment.

FIG. 7 illustrates a case where the transmission channel of the wireless medium is available at the end of the second backoff period in the second backoff state 305 as shown in FIG. 6. More specifically, referring to FIG. 7, when the IFS period has elapsed after the data reception is completed with the frame-sense signal FS going inactive, the waiting state 303 is ended and the first backoff state 304 is started even when the transmission channel is available. After the randomly determined amount of time has elapsed, the backoff processing controller 203 makes the backoff end signal BE active. At this time, if the carrier-sense signal CS is active, or the transmission channel is occupied by another terminal, then the transmission process controller 201 changes into the second backoff state 305 with the backoff start signal BS going active. If the carrier-sense signal CS is inactive when the second backoff period (another randomly determined amount of time) has been terminated, then the transmission process controller 201 makes the request-to-send signal RTS2 active, which starts the transmission procedures as mentioned above. Since each backoff period is determined randomly for each terminal, there is dramatically reduced the probability that a plurality of terminals start the transmission procedures at the same time.

FIG. 8 illustrates a case where the transmission channel of the wireless medium is not available at the end of the third backoff period in the third backoff state 306 as shown in FIG. 6. More specifically, referring to FIG. 8, when the IFS period has elapsed after the data reception is completed with the frame-sense signal FS going inactive, the waiting state 303 is ended and the first backoff state 304 is started even when the transmission channel is available. After a randomly determined amount of time has elapsed, the backoff processing controller 203 makes the backoff end signal BE active. At this time, if the carrier-sense signal CS is active, or the transmission channel is occupied by another terminal, then the transmission process controller 201 changes into the second backoff state 305 with the backoff start signal BS going active. Similarly, if the carrier-sense signal CS is active at the time when a second randomly determined amount of time has elapsed, the transmission process controller 201 changes into the third backoff state 306. Finally, if the carrier-sense signal CS is also active at the time when a third randomly determined amount of time has elapsed, the transmission process controller 201 changes state into the transmission stop 307 where the request-to-send signal RTS2 remains inactive and the collision-detection signal CDT goes active. At the same time, the clear-to-send signal CTS3 becomes active in order to send dummy data to the wireless modem 104. Since the wireless modem 104 receives the request-to-send signal RTS2 which is inactive, the dummy data received from the wired-LAN controller 103 is discarded.

What is claimed is:

1. An access control method of a wireless terminal in a wireless network employing a carrier sense multiple access (CSMA) scheme, said method comprising the steps of:

monitoring the termination of a transmission inhibition period;

monitoring the occurrence of a transmission request;

generating a random-determined time period when said transmission request occurs during said transmission inhibition period, said random-determined time period starting from said termination of said transmission inhibition period;

waiting to start data transmission associated with said transmission request until said random-determined time period has elapsed after said termination of said transmission inhibition period;

checking whether a predetermined channel for transmission is available at the end of said random-determined time period; and starting said data transmission associated with said transmission request when said random-determined time period has elapsed and said predetermined channel for transmission is available.

2. The access control method according to claim 1, wherein said transmission inhibition period is a total of a data reception period and a predetermined time period following said data reception period, said predetermined time period is previously determined depending on said wireless network.

3. The access control method according to claim 2, wherein said predetermined time period is determined by an interframe spacing (IFS) period for spacing between data frames, and said random-determined time period is determined by a predetermined backoff processing procedure.

4. An access control method of a wireless terminal in a wireless network employing a carrier sense multiple access (CSMA) scheme, said method comprising the steps of:

a) monitoring the termination of data reception;

b) monitoring the occurrence of a transmission request;

c) generating a time period when said data reception is terminated, said time period starting from said termination of said data reception, and said time period being predetermined depending on said wireless network;

d) generating a random amount of time when said transmission request occurs during a transmission inhibition period comprising a total of a data reception period and said time period;

e) waiting to start data transmission associated with said transmission request until said random amount of time comes to an end;

f) checking whether a predetermined channel for transmission is available at the end of said random amount of time;

g) starting said data transmission associated with said transmission request when said random amount of time has elapsed and said predetermined channel for transmission is available;

h) repeating said steps (d)–(g) while said predetermined channel for transmission is not available until the repetition number reaches a predetermined maximum value; and i) stopping said step (g) when said predetermined channel for transmission is not available with the repetition number exceeding said predetermined maximum value.

5. The access control method according to claim 4, wherein said time period is determined by an interframe spacing (IFS) period for spacing between data frames, and said random amount of time is determined by a predetermined backoff processing procedure.

6. The access control method according to claim 4, wherein said wireless network employs a carrier sense multiple access with collision detection (CSMA/CD) scheme.

7. An access control system of a wireless terminal in a wireless network employing a carrier sense multiple access (CSMA) scheme, said system comprising:

first monitoring means for monitoring the termination of a transmission inhibition period;

second monitoring means for monitoring the occurrence of a transmission request;

generating means for generating a random-determined time period when said transmission request occurs during said transmission inhibition period, said random-determined time period starting from said termination of said transmission inhibition period; and control means for controlling a transmission process such that data transmission associated with said transmission request waits until said random-determined time period has elapsed after said termination of said transmission inhibition period, it is checked whether a predetermined channel for transmission is available at the end of said random-determined time period, and said data transmission associated with said transmission request is started when said random-determined time period has elapsed and said predetermined channel for transmission is available.

8. The system according to claim 7, wherein said transmission inhibition period is a total of a data reception period and a predetermined time period following said data reception period, said predetermined time period is previously determined depending on said wireless network.

9. The system according to claim 8, wherein said predetermined time period is determined by an interframe spacing (IFS) period for spacing between data frames, and said random-determined time period is determined by a predetermined backoff processing procedure.

10. An access control system of a wireless terminal in a wireless network employing a carrier sense multiple access (CSMA) scheme, said system comprising:

first monitoring means for monitoring the termination of data reception;

second monitoring means for monitoring the occurrence of a transmission request;

first generating means for generating a time period when said data reception is terminated, said time period starting from said termination of said data reception, and said time period being predetermined depending on said wireless network;

second generating means for generating a random amount of time when said transmission request occurs during a transmission inhibition period including a total of a data reception period and said time period; and control means for performing a first transmission process control such that data transmission associated with said transmission request waits until said random amount of time comes to an end, it is checked whether a predetermined channel for transmission is available at the end of said random amount of time, and said data transmission associated with said transmission request starts when said random amount of time has elapsed and said predetermined channel for transmission is available.

11. The system according to claim 10, wherein said time period is determined by an interframe spacing (IFS) period for spacing between data frames, and said random amount of time is determined by a predetermined backoff processing procedure.

12. The system according to claim 11, wherein said wireless network employs a carrier sense multiple access with collision detection (CSMA/CD) scheme.

13. The system according to claim 10, wherein said control means further performs a second transmission process control such that said first transmission process control is repeated while said predetermined channel for transmission is not available until the repetition number reaches a predetermined maximum value, and said data transmission is stopped when said predetermined channel for transmission is not available with the repetition number exceeding said predetermined maximum value.

14. A terminal in a wireless local-area network (LAN), said terminal comprising:

a wireless transmitting-receiving system having a channel monitoring function;

a wired-LAN controller incorporating a carrier sense multiple access with collision detection (CSMA/CD) scheme; and an access controller intervening between said wireless transmitting-receiving system and said wired-LAN controller, said access controller comprising:

first monitoring means for monitoring the termination of data reception;

second monitoring means for monitoring the occurrence of a transmission request;

first generating means for generating a time period when said data reception is terminated, said time period starting from said termination of said data reception, and said time period being predetermined depending on said wireless network;

second generating means for generating a random amount of time when said transmission request occurs during a transmission inhibition period including a total of a data reception period and said time period; and control means for performing a first transmission process control such that data transmission associated with said transmission request waits until said random amount of time comes to an end, it checks whether a predetermined channel for transmission is available at the end of said random amount of time, and said data transmission associated with said transmission request starts when said random amount of time has elapsed and said predetermined channel for transmission is available.

15. The terminal according to claim 14, wherein said time period is determined by an interframe spacing (IFS) period for spacing between data frames, and said random amount of time is determined by a predetermined backoff processing procedure.

16. The terminal according to claim 14, wherein said control means further performs a second transmission process control such that said first transmission control is repeated while said predetermined channel for transmission is not available until the repetition number reaches a predetermined maximum value, and said data transmission is stopped when said predetermined channel for transmission is not available with the repetition number exceeding said predetermined maximum value.

17. A terminal in a wireless local-area network (LAN), said terminal comprising:

a wireless transmitting-receiving system having a channel monitoring function;

a wired-LAN controller incorporating a carrier sense multiple access with collision detection (CSMA/CD) scheme; and an access controller intervening between said wireless transmitting-receiving system and said wired-LAN controller, said access controller comprising:

a delay timer generating a time period when data reception is terminated, said time period starting from said termination of said data reception, and said time period being predetermined depending on said wireless LAN network;

a backoff processor generating a random amount of time when a transmission request is received from said wired-LAN controller during a transmission inhibition period including a total of a data reception period and said time period; and a transmission process controller performing a first transmission process control such that data transmission associated with said transmission request waits until said random amount of time comes to an end, it is checked whether a predetermined channel for transmission is available at the end of said random amount of time, and said data transmission associated with said transmission request starts when said random amount of time has elapsed and said predetermined channel for transmission is available.

18. The terminal according to claim 17, wherein said time period is determined by an interframe spacing (IFS) period for spacing between data frames.

19. The terminal according to claim 17, wherein said transmission process controller further performs a second transmission process control such that said first transmission control is repeated while said predetermined channel for transmission is not available until the repetition number reaches a predetermined maximum value, and said data transmission is stopped when said predetermined channel for transmission is not available with the repetition number exceeding said predetermined maximum value.

* * * * *